Patented Mar. 13, 1951

2,545,305

UNITED STATES PATENT OFFICE 2,545,305

DIHYDROPTEROYLGLUTAMIC ACID AND
PROCESS FOR PREPARING THE SAME

Boyd L. O'Dell, Columbia, Mo., assignor to Parke,
Davis & Company, Detroit, Mich., a corporation of Michigan No Drawing. Application September 14, 1946,
Serial No. 697,155

3 Claims. (Cl. 260—251.5)

The invention relates to the preparation of new organic compounds which are useful in nutrition and therapy and also as intermediates for the preparation of vitamin Bc and its derivatives. More particularly, the invention relates to the preparation of dihydro-vitamin Bc, otherwise known as dihydropteroylglutamic acid.

Vitamin Bc is an antianemia factor and can be obtained from various natural starting materials, such as liver tissue or yeast, by hydrolytic, enzymatic or like treatment of such materials, followed by isolation procedures. Vitamin Bc is N-[4-([(2-amino-4-hydroxy-6-pteridyl)methyl]amino)benzoyl] glutamic acid, otherwise known as pteroylglutamic acid, and may be represented by the formula,

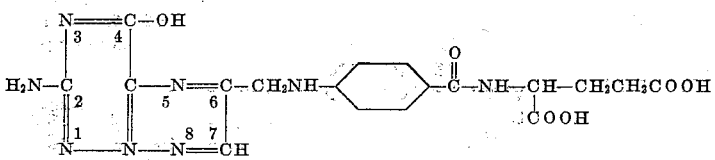

Vitamin Bc

I have now found that dihydro-N-[4-([(2-amino-4-hydroxy-6-pteridyl)methyl)amino)-benzoyl] glutamic acid can be prepared by chemical methods and is an excellent intermediate for the preparation of vitamin Bc itself as well as for the preparation of conjugates of the latter with more glutamic acid residues and other derivatives of vitamin Bc. I have also found that, for practical purposes, the new dihydro-product can be administered directly to the animal or human organism with results comparable in numerous instances to those obtained when administering vitamin Bc itself. This is probably due to the fact that the dihydro compound readily oxidizes in air to vitamin Bc.

In preparing my new dihydro-vitamin Bc I can start with relatively simple chemicals and synthesize the dihydro compound. Alternatively, I can start with the isolated vitamin Bc and directly hydrogenate it to get dihydro-vitamin Bc.

The invention will be understood from the following examples.

Example 1

29 milligrams of pure dry vitamin Bc (pteroylglutamic acid), prepared for example as described by Pfiffner et al. in Science, volume 97, page 404 (1943), are dissolved in 15 cc. of 0.1 N sodium hydroxide solution and put in a microhydrogenation apparatus with 200 milligrams of palladium-barium sulfate catalyst (5% palladium). The mixture is shaken in a hydrogenation apparatus like that described by Smith, J. Biol. Chem., 96, 35 (1932), in an atmosphere of hydrogen for about 6 hours and the total amount of hydrogen absorbed determined at the end of this time. In this example almost exactly the calculated amount of hydrogen (1 mole) is taken up to convert the vitamin (1 mole) with empirical formula, $C_{19}H_{19}O_6N_7$, into the new dihydro-vitamin Bc (dihydropteroylglutamic acid) of formula, $C_{19}H_{21}O_6N_7$. During the hydrogenation the yellow color of the original solution gradually fades to give a clear colorless solution. Thus, the new dihydro compound is colorless, as distinguished from the vitamin itself which is colored yellow. However, the dihydro compound quickly turns brown upon exposure to air or oxygen.

While excluding air as much as possible, the alkaline hydrogenation solution is filtered from the catalyst and the filtrate immediately adjusted to pH 3.0 by dilute hydrochloric acid. This causes the dihydro-vitamin Bc to precipitate in fine micro-crystalline form. The precipitated dihydro-compound is washed four times with 0.01 N hydrochloric acid and once with water. It is then dried over calcium chloride in a vacuum desiccator. For analysis it is further dried at 145° C. in a high vacuum to constant weight and gives the following analytical figures.

Calculated for $C_{19}H_{21}O_6N_7$:
C, 51.47%; H, 4.77%
Found:
C, 51.39%; H, 4.77%
51.16        4.57

The ultraviolet absorption curve of vitamin Bc in alkaline solution has maxima at 255, 282 and 365 mμ but the curve of the new dihydro-vitamin Bc of this example in alkaline solution has only one maximum, located at 284 mμ, with molecular extinction of 21,300 at pH 11.0. The following Example 2 shows the relationship of the new dihydro-compound to vitamin Bc.

Example 2

10 milligrams of pure dry dihydro-vitamin Bc (dihydropteroylglutamic acid) from Example 1 are dissolved in 15 cc. of 0.1 N sodium hydroxide solution and shaken at room temperature with a definite volume of oxygen in a closed system for 3 hours. The oxygen uptake is then measured and is found to be almost exactly the amount required to oxidize (dehydrogenate) 10 milligrams of dihydro-vitamin $B_c$ of formula $C_{19}H_{21}O_6N_7$ into vitamin $B_c$ of formula $$C_{19}H_{19}O_6N_7$$

The yellow alkaline oxidation solution is brought to pH 3.0 by adding thereto 1.0 N hydrochloric acid. This precipitates the vitamin $B_c$ which is collected, washed three times with water, and dried. The dry product is dissolved in 1 N hydrochloric acid and any small amount of insoluble material removed from the solution which is thereafter adjusted to pH 3.0 with dilute alkali. The vitamin again precipitates, is filtered off, recrystallized from hot water and dried over calcium chloride. For analysis, it is dried at 145° C. in a high vacuum. The product is a yellow crystalline compound identical with the starting material used in Example 1 and having the ultraviolet absorption characteristics of vitamin $B_c$. Analytical figures for the dry product are:

Calculated for $C_{19}H_{19}O_6N_7$:
   C, 51.71%; H, 4.34%
Found:
   C, 52.16%; H, 4.10%

By running this oxidation example in the presence of the hydrogenation catalyst used in Example 1, only 1 hour, instead of 3 hours, is needed to completely convert the dihydro-vitamin $B_c$ to the vitamin.

*Example 3*

14.1 grams of 2,4,5-triamino-6-hydroxypyrimidine ($C_4H_7ON_5$) are dissolved, along with 26.6 grams of p-aminobenzoyl-1(+)-glutamic acid ($C_{12}H_{14}O_5N_2$), in 2 liters of hot distilled water which has been boiled to remove air and in which is dissolved a buffer mixture consisting of 12.3 grams of sodium acetate ($NaOOCCH_3$) and 9 grams of acetic acid ($HOOCCH_3$). The hot solution of the triamine and the amino acid is filtered to remove any small amount of solids or undissolved materials which may be present, the filtrate cooled, and then 21.6 grams of 2,3-dibromopropionaldehyde added gradually while stirring vigorously. All of the foregoing operations are carried out in a closed system with strict exclusion of oxygen or air, e. g. in an atmosphere of nitrogen.

After the reaction mixture is stirred for 24 hours, it is brought to pH 3.0 by the addition of air-free 1.0 N hydrochloric acid. This precipitates dihydro-vitamin $B_c$ (dihydropteroylglutamic acid) which is filtered off, washed three times with air-free 0.01 N hydrochloric acid and once with air-free water and then dried. All of these operations are in the absence of air or oxygen.

The dihydro-vitamin of this example, like that of Example 1, can readily be oxidized to the vitamin as described under Example 2 for the dihydro compound of Example 1.

*Example 4*

2 grams of sodium acetate and 2.66 grams of p-aminobenzoyl-1(+)-glutamic acid are dissolved in 300 cc. of air-free distilled water while blanketing the solution with nitrogen. Nitrogen is bubbled through the solution and 1.4 grams of α-bromoacrolein are added with stirring. The mixture is stirred for 15 minutes and the resulting solution added to a solution of 1.55 grams of 2,4,5-triamino-6-hydroxypyrimidine in 200 cc. of air-free water. A precipitate separates from the reaction mixture a short time after the reactants are mixed together. The reaction mixture is shaken under nitrogen for 48 hours and is then brought to a pH of 3.0 by addition of air-free 1.0 N hydrochloric acid. The dihydro-vitamin $B_c$ (dihydropteroylglutamic acid) which separates upon adding the hydrochloric acid is filtered off, washed twice with air-free 0.01 N hydrochloric acid and once with air-free distilled water and then dried. All of the foregoing operations are conducted with strict exclusion of air or oxygen. The dihydro-vitamin $B_c$ product of this example, like those of Examples 1 and 3, has the empirical formula $C_{19}H_{21}O_6N_7$ and can be readily oxidized to vitamin $B_c$.

In Example 1 above, the catalytic hydrogenation of vitamin $B_c$ to its dihydro derivative under alkaline conditions is described wherein palladium metal is used as a catalyst. Instead of using palladium, any other noble metal catalyst, or combinations thereof, may be used which are capable of catalyzing the addition of two atoms of hydrogen to vitamin $B_c$.

What I claim as my invention is:

1. The process which comprises hydrogenating vitamin $B_c$ under alkaline conditions with hydrogen in the presence of a noble metal catalyst thereby obtaining dihydropteroylglutamic acid.

2. The process which comprises hydrogenating vitamin $B_c$ in alkaline aqueous solution in the presence of a palladium catalyst thereby obtaining dihydropteroylglutamic acid.

3. The compound, dihydropteroylglutamic acid.

BOYD L. O'DELL.

REFERENCES CITED

The following references are of record in the file of this patent:

UNITED STATES PATENTS

| Number | Name | Date |
|---|---|---|
| 2,500,296 | Waller et al. | Mar. 14, 1950 |

OTHER REFERENCES

Liebig's Annalen, vol. 548, pp. 284–289.